(12) United States Patent
Ridley et al.

(10) Patent No.: US 8,644,836 B2
(45) Date of Patent: Feb. 4, 2014

(54) IP PHONE ROUTING AND CALL INITIATION BASED ON LOCATION INFORMATION

(75) Inventors: Jeffrey Ridley, Santa Clara, CA (US); Pascal Crausaz, San Jose, CA (US); Edwin Basart, Los Altos, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 1403 days.

(21) Appl. No.: 11/890,304

(22) Filed: Aug. 3, 2007

(65) Prior Publication Data
US 2009/0247188 A1   Oct. 1, 2009

(51) Int. Cl.
*H04W 40/00*   (2009.01)
(52) U.S. Cl.
USPC .......................................................... 455/445
(58) Field of Classification Search
USPC .............. 455/417, 554, 415, 567, 550.1, 420, 455/456.1, 456.6, 456.2, 456.3, 435.1, 445, 455/560, 426.1; 379/220.1, 201.1, 212.1; 370/352, 328

See application file for complete search history.

(56) References Cited

U.S. PATENT DOCUMENTS

| 6,725,045 | B2 | 4/2004 | Oren et al. |
| 6,745,025 | B1 * | 6/2004 | Chow et al. ................... 455/417 |
| 7,069,291 | B2 | 6/2006 | Graves et al. |
| 2002/0052208 | A1 * | 5/2002 | Porcino ......................... 455/456 |
| 2005/0143057 | A1 * | 6/2005 | Shiraga et al. ................ 455/417 |
| 2006/0072726 | A1 * | 4/2006 | Klein et al. .............. 379/201.01 |
| 2007/0037605 | A1 * | 2/2007 | Logan ........................... 455/567 |
| 2007/0202927 | A1 * | 8/2007 | Pfleging et al. ............... 455/567 |

* cited by examiner

*Primary Examiner* — Kiet Doan
(74) *Attorney, Agent, or Firm* — Van Pelt, Yi & James LLP

(57) ABSTRACT

Routing an incoming call for an IP phone system is disclosed. A location data for a mobile device is received. A way point based at least in part on the location data is determined. A state for a user of the IP phone system is determined based at least in part on the way point. An incoming call is routed to the IP phone system based at least in part on the state.

24 Claims, 9 Drawing Sheets

IP PHONE ROUTING AND CALL INITIATION BASED ON LOCATION INFORMATION

BACKGROUND OF THE INVENTION

With the availability of mobile phones, phone behavior and preferences for what is desired from a phone system expands. In particular, situations in which a phone call is desirable, is not desirable, needs forwarding, needs to be sent to voicemail, needs to be sent to an assistant, requires a specific message, etc. depend upon the circumstances in which a user finds him or herself.

BRIEF DESCRIPTION OF THE DRAWINGS

Various embodiments of the invention are disclosed in the following detailed description and the accompanying drawings.

DETAILED DESCRIPTION

Figure 1:
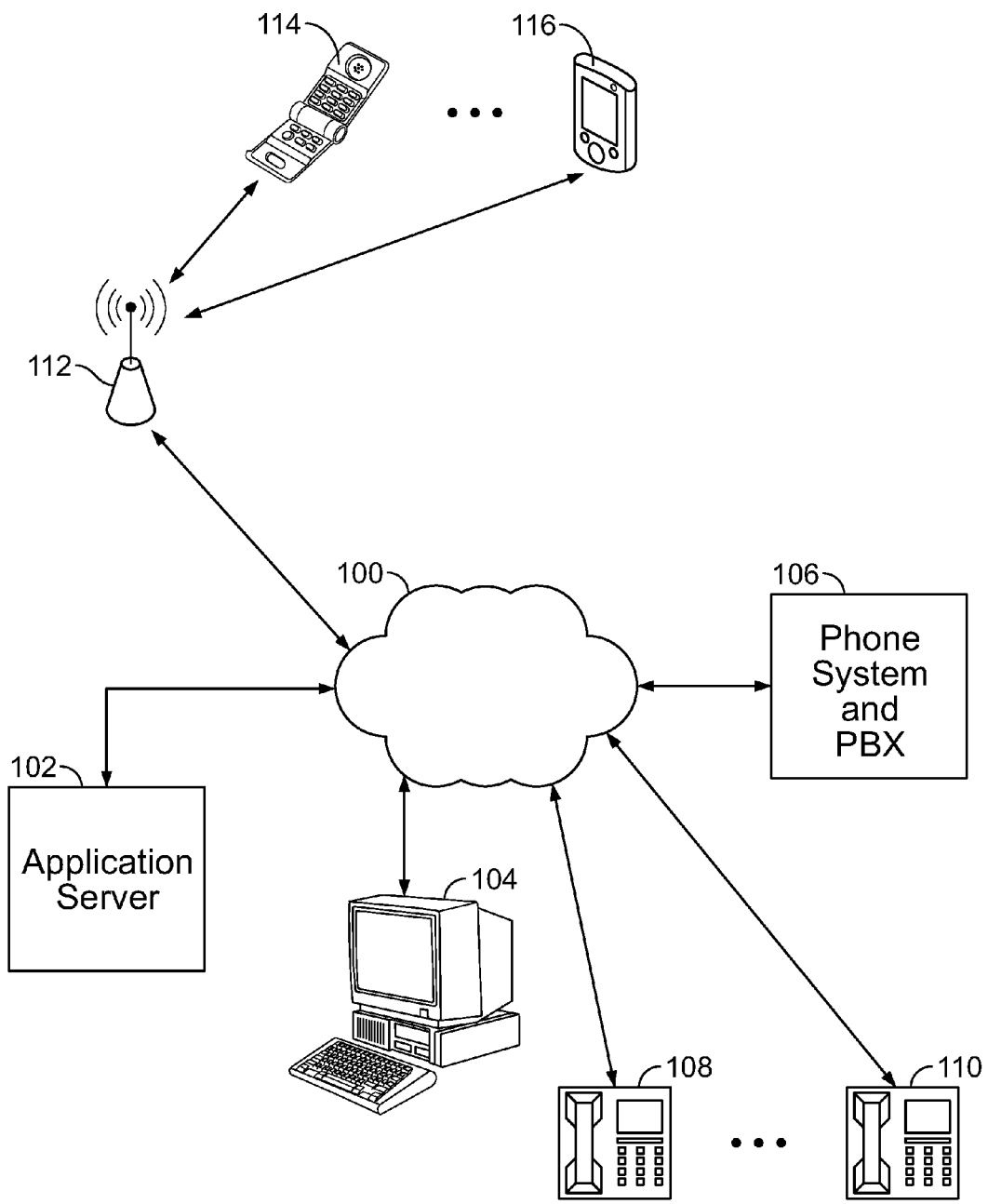
FIG. 1 is a block diagram illustrating an embodiment of a system for routing based on location information.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Routing an incoming call for an internet protocol (IP) phone system is disclosed. In some embodiments, a location is received where a mobile device located. The location is mapped to a way point. A way point is associated with an area that is associated with a default behavior for incoming calls to a user. For example, when a user with a mobile device is reported to be in a location and the location is within an area that is designated as a conference room, incoming calls for the user are routed to a voice message that indicates that the user is in a conference and then routed to the voicemail system so that the incoming caller can leave a message. For another example, a location for a mobile device of a user is indicated that is within an area designated as a home office. An incoming call is routed to the home office phone number during working hours and to voicemail on weekends and after working hours during the work week. A way point is associated with an area that is associated with a default behavior for initiating calls using the phone system from a user. For example, when a user with a mobile device is reported to be in a location and the location is within an area that is designated as a conference room, the user indicates a desire to initiate a call from the mobile device using the IP phone system; the IP phone system initiates the call by calling the mobile device and also calls the desired destination of the call in order to maintain control of the call (e.g., not just using the mobile device carrier phone system).

In some embodiments, combining location information and state handling for a phone system enables more effective and flexible handling of routing for a phone system. The location information enables greater customized behavior that is in line with a user's desired phone usage. In various embodiments, a phone system routes incoming calls based on one or more of the following: a day of the week, a date, a time, a holiday, a previous state, a previous way point, a location, an incoming caller's identity (e.g., phone number), a call handling mode (e.g., standard, in a meeting, out of the office, extended absence, custom), phone presence (e.g., on call, in voicemail, off hook, busy, on hold, etc.), a buddy list (e.g., on or not on a buddy list), a computer presence state (e.g., a computer presence state such as on line, busy, not on computer, available, away, off line, presenting with PowerPoint™, surfing the web, etc.), or any other appropriate parameter. In some embodiments, a phone system initiates calls from a user to a specified device/person/phone number/handle based on a previous state, a previous way point, a location, or any other appropriate parameter.

In various embodiments, a call is routed to a fixed device located at/nearby a way point or a mobile device. In some embodiments, a call is continuously routed to different way points closest to the location indicated by a mobile device. In some embodiment, other information in addition to voice information is also routed along with the voice information (e.g., web browsing data, multimedia content, video, audio, etc.).

In some embodiments, a location data for a mobile device is received. A way point is determined based at least in part on the location data. For example, sometimes the selected way point is the nearest way point or the location data indicates that the location is within an area associated with a way point (e.g., a room, grounds, a road, a building, an office, a conference room, etc.). In some embodiments, there is not a way point associated with a location or the location can not be determined and a default behavior is adopted. A state is determined for a user of the IP phone system based at least in part on the way point. A state is a label associated with a number of phone system rules or behaviors for routing, for voice message to be played, voice mail, forwarding, etc. An incoming call to the IP phone system is routed based at least in part on the state.

FIG. 1 is a block diagram illustrating an embodiment of a system for routing based on location information. In the example shown, phone system and PBX (private branch exchange) 106 can communicate with network 100. Network 100 comprises one or more networks capable of transferring data—for example, a local area network, a wide area network, a wired network, a wireless network, or the Internet. A plurality of VoIP phones, represented in FIG. 1 by 108 and 110, can also communicate with network 100. The capabilities of the VoIP phones and phone system and PBX 106 enable users of the VoIP phones to make and receive phone calls. Computer 104 or Mobile device 114 or 116 are able to communicate with network 100 and are capable of performing some functions (e.g., viewing voicemail, call activity, dialing phone, changing personal settings, setting way points, etc.) regarding the VoIP phones and phone system and PBX 106 using personal call manager software. Application server 102 is connected to network 100 and enables voicemail functionality for a VoIP phone system as well as routing of calls. Application server 102 also enables IP telephony applications to be run by mobile devices including voicemail functionality, represented in FIG. 1 by cell phone 114 and personal data assistant/smart phone 116. Mobile devices can communicate with network 100 via a data channel of a cellular phone system (e.g., using a 2.5 G data link associated with a voice cellular system), where access point 112 is acting as a part of a cellular phone system. Access point 112 enables the mobile devices to communicate with application server 102. In various embodiments, access point 112 is associated with a cell phone system, a wireless network access point, a WiFi™ system, or any other appropriate access point for enabling communication with application server 102.

In various embodiments, phone system and PBX 106 and application server 102 capabilities are supported by one physical box of hardware, each by one or more pieces of physical hardware, or any other configuration that can support appropriate routing functionality.

Figure 2:
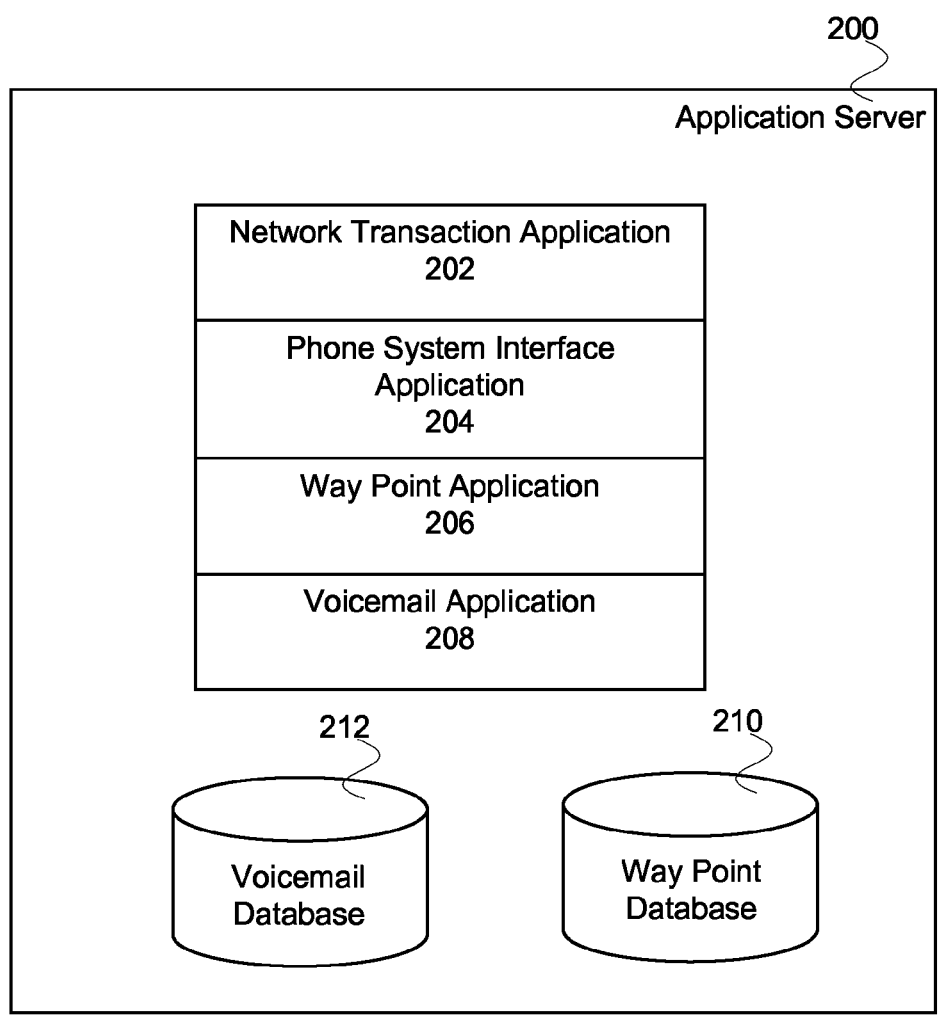
FIG. 2 is a block diagram illustrating an embodiment of software for an application server.

FIG. 2 is a block diagram illustrating an embodiment of software for an application server. In some embodiments, application server 200 of FIG. 2 is used to implement application server 102. In the example shown, application server 200 includes network transaction application 202, phone system interface application 204, way point application 206, voicemail application 208, way point database 210, and voicemail database 212. Application server 200 receives requests and provides responses to the received requests from mobile devices regarding previewing of voicemail. Mobile devices communicate with application server 200 via a data channel associated with a cellular phone system and the Internet. Network transaction application 202 handles the interface for application server 200 for communications with the mobile devices via the Internet.

Way point application 206 and way point database 210 are used to provide capabilities for routing calls based on a location associated with a mobile device for a given user. For example, a user is near the user's office way point (e.g., in his/her office) during working hours; so in-coming calls to an IP phone system are routed to a number associated with the way point (e.g., the user's office phone) and, if not picked up, to the user's voicemail. For another example, a user is near a way point at a courthouse during working hours; so in-coming calls are played a message indicating the user is unavailable and calls are routed to a number associated with the way point (e.g., an assistant's phone number).

Voicemail application 208 provides voicemail capability for an IP phone system including managing voicemail database 212. Voicemail application 208 and voicemail database 212 provide the capabilities of storing, previewing, retrieving, saving, deleting, etc. voicemails associated with a phone number. Voicemail application 208 services requests from mobile devices and also from phones and computers attached to a network (e.g., VoIP personal call managers running on a user's computer or a VoIP phone hooked to a local area network). Requests from phones and computers attached to a local network are handled by phone system interface application 204.

Figure 3:
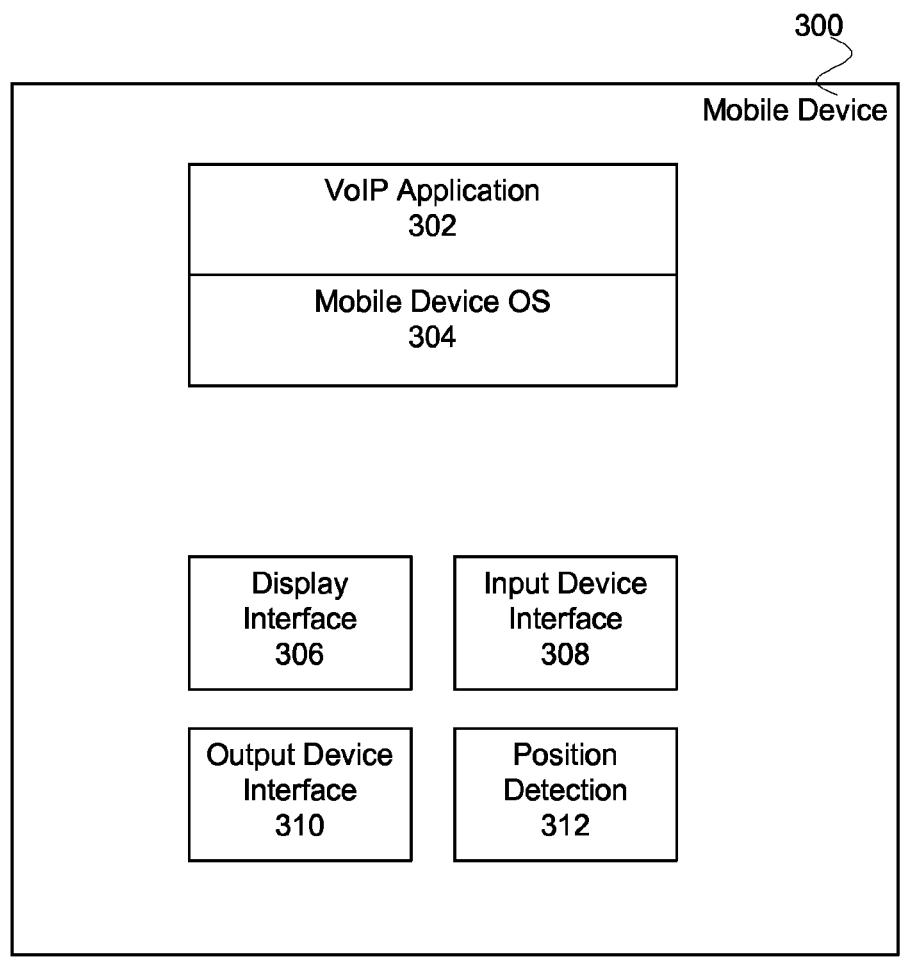
FIG. 3 is a block diagram illustrating an embodiment of software for a mobile device.

FIG. 3 is a block diagram illustrating an embodiment of software for a mobile device. In some embodiments, mobile device 300 of FIG. 3 is used to implement mobile device 114 or 116 of FIG. 1. In the example shown, mobile device 300 includes VoIP application 302, mobile device OS (operating system) 304, display interface 306, input device interface 308, output device interface 310, and position detection 312. Mobile device 300 can receive and initiate VoIP calls as well as access voicemail by connecting through the voice channel and/or data channel of a carrier system. VoIP application 302 provides functionality to display voicemail available for previewing and to select and request a voicemail for previewing as well as other VoIP functions including setting way point settings/associated phone numbers and routing preferences. Display interface 306 handles the interface to a display that can list voicemails available for preview including relevant information regarding the voicemail such as caller ID for the incoming message, length of message, and date and time of the message. Input device interface 308 handles the interface to a keypad, wheel, five-way toggle switch, stylus, or any other appropriate input device for the mobile device. The input device can be used by a user to select the previewing menu, select a particular voicemail to preview, and issue other relevant commands related to previewing. Output device interface 310 handles the interface to a speaker or head phone jack driver, which enables playing a preview of a voicemail for a user. Position detection 312 comprises a global position system device that enables determining a location (e.g., a longitude, latitude, etc.). In some embodiments, location is determined using one or more visible access point location (e.g., the location of the wireless access point or cell access point). In various embodiments, location information is determined in terms of longitude, latitude, elevation, from a location indicated on a map, from coordinates, from triangulations, etc. It should be noted that a location may or may not be associated with an area or a way point.

In various embodiments, a way point application (e.g., way point application 206 of FIG. 2) and a way point database (e.g., way point database 210 of FIG. 2) is included on the mobile device either instead of or in addition to being included in a server application.

In some embodiments, VoIP application 302 is not included and a mobile device application is used for desired functionality to interface with a server. For example, a mobile device application enabling a web application to run (e.g., a VoIP application) on the mobile device is sufficient to achieve the desired IP telephone functionality.

Figure 4:
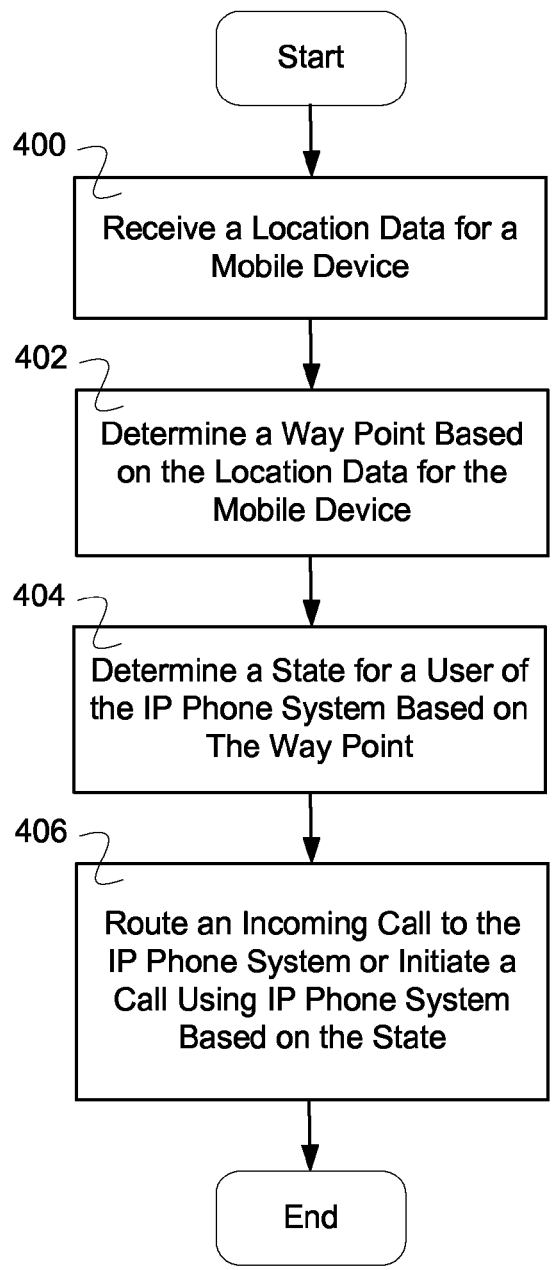
FIG. 4 is a flow diagram illustrating an embodiment of a process for routing calls based on location information.

FIG. 4 is a flow diagram illustrating an embodiment of a process for routing calls based on location information. In the example shown, in 400 a location data is received for a mobile device. In some embodiments, the location data includes a latitude and longitude. In some embodiments, the location data includes an elevation. In 402, a way point is determined based on the location data for the mobile device. The way point determination comprises locating a way point that is closest to the location indicated by the location data, within an associated area of a way point, or any other appropriate determination based on the location data. In some embodiments, the area associated with a way point is specified using a center location and a radius of a circle around the center location. In some embodiments, the area associated with a way point corresponds to a room in a building, a yard around a house, the grounds around a building, or any other appropriate area. In 404, a state for a user of the IP phone system is determined based on the way point. In various embodiments, a state or mode comprises one or more of the following: at work, in the office, out of the office, in a conference, at court, at home, on vacation, unavailable, in the library, in a boardroom, at lunch, on the road, on the phone, on call, off-hook, on-hook, in voicemail, in a meeting, extended leave, custom, standard, offline, online, away, busy, do-not-disturb, or any other appropriate state. Associated with a state there is a default state which can include behaviors for routing, forwarding, finding, voicemail message, etc. The default state associated with a way point can be adjusted or modified based at least in part on a set of rules based on other conditions such as the date (e.g., a holiday, birthday, anniversary, etc.), the time, the day of the week, a previous state, a previous way point, incoming caller's phone number, call handling mode, buddy list, presence state, or any other appropriate other condition. In 406, an incoming call to the IP phone system is routed or a call is initiated based on the state. In various embodiments, the incoming call routing can be to a phone number, voicemail, and/or a message. In various embodiments, a call can be initiated to a phone number based on the state. For example, the IP phone system initiates a call by calling a home office phone and also calling a desired phone number that is the destination calling number and connecting the two calls. This enables the IP phone system to maintain control and allow for all IP phone functionality (e.g., conference calling, forwarding, hold, etc.) during the call that was initiated. In various embodiments, the IP phone system initiates the call to both parties of the call using an application resident on a computer, on a mobile device, on a dedicated IP phone, or any other appropriate device or hardware.

Figure 5:
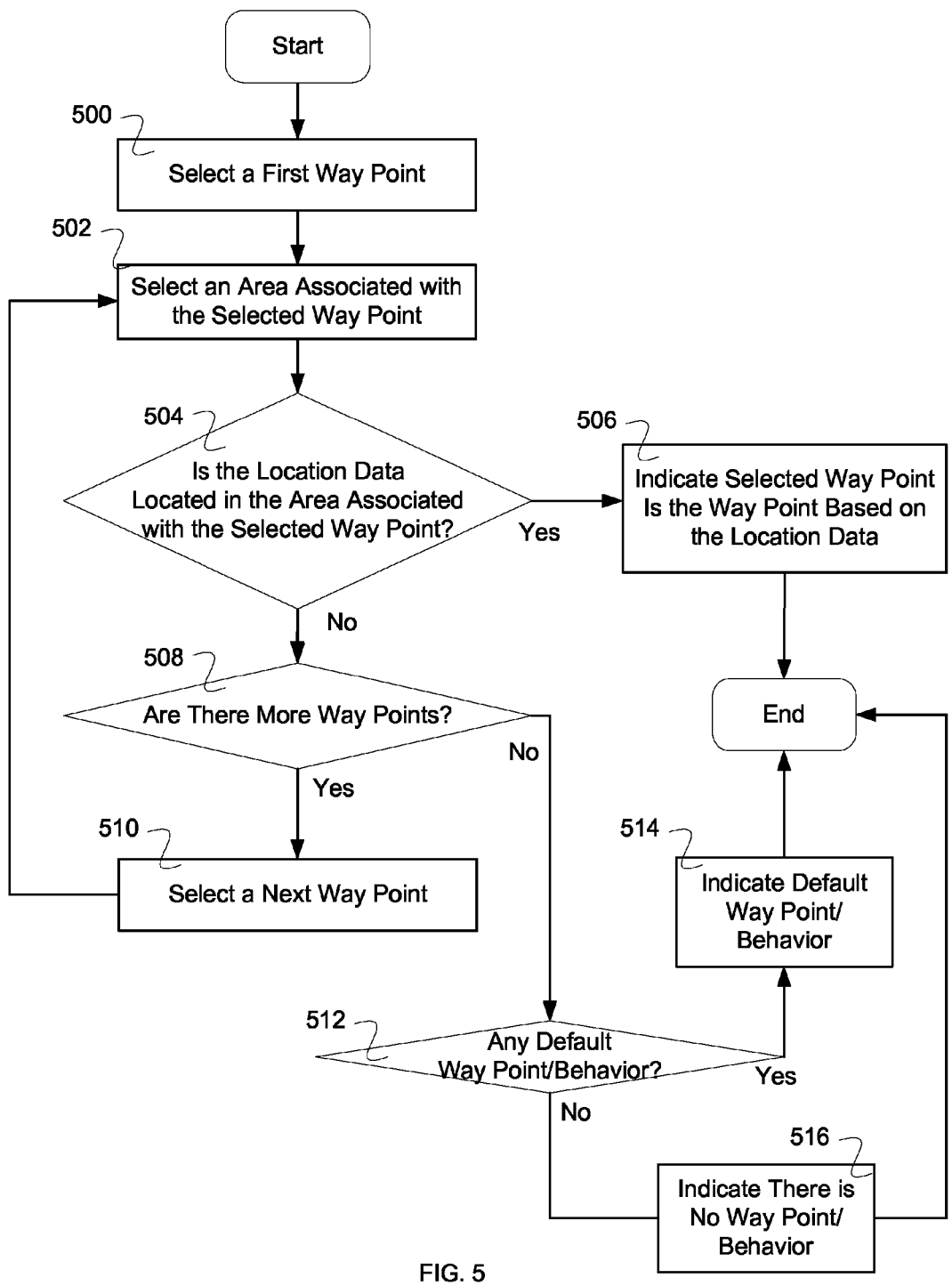
FIG. 5 is a flow diagram illustrating an embodiment of a process for indicating a selected way point based on a location data.

FIG. 5 is a flow diagram illustrating an embodiment of a process for indicating a selected way point based on a location data. In the example shown, in 500 a first way point is selected. In some embodiments, a way point and associated information are stored in a database such as way point database 210 of FIG. 2 and/or on a mobile device. In 502, an area associated with the selected way point is selected. In 504, it is determined if the location data is in the area associated with the selected way point. If the location is in the area, then in 506 it is indicated that the selected way point is the way point based on the location data, and the process ends. If the location is not in the area, then in 508 it is determined if there are more way points. If there are more way points, then in 510 a next way point is selected and control passes to 502. If there are no more way points, in 512 it is determined if there is a default way point/behavior defined. If there is a default way point/behavior defined, then in 514 the default way point/behavior is indicated, and the process ends. If there is no default way point/behavior, then in 516 it is indicated that there is no way point/behavior defined, and the process ends.

Figure 6A:
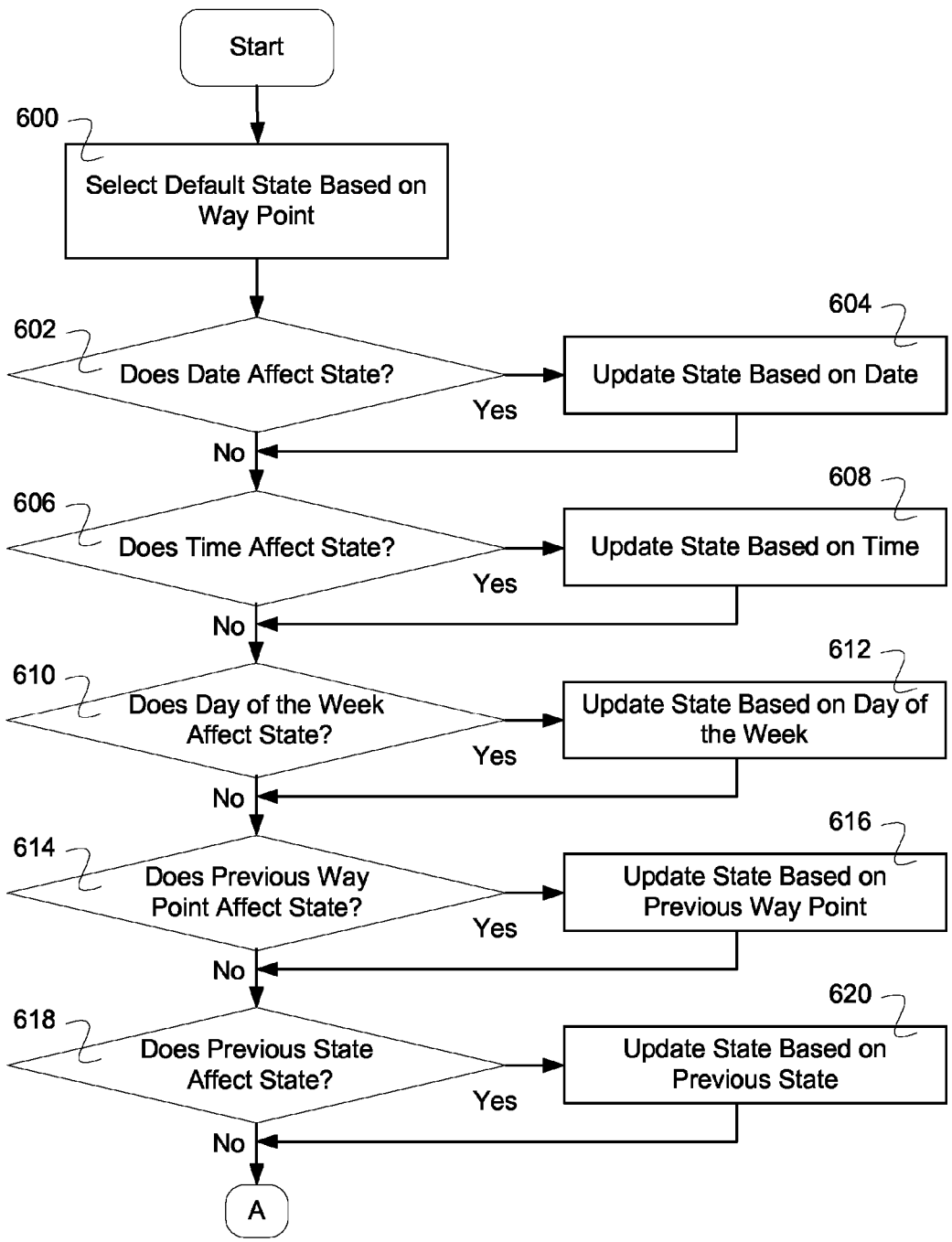
FIGS. 6A and 6B are flow diagrams illustrating an embodiment of a process for selecting a state based on a way point.
Figure 6B:
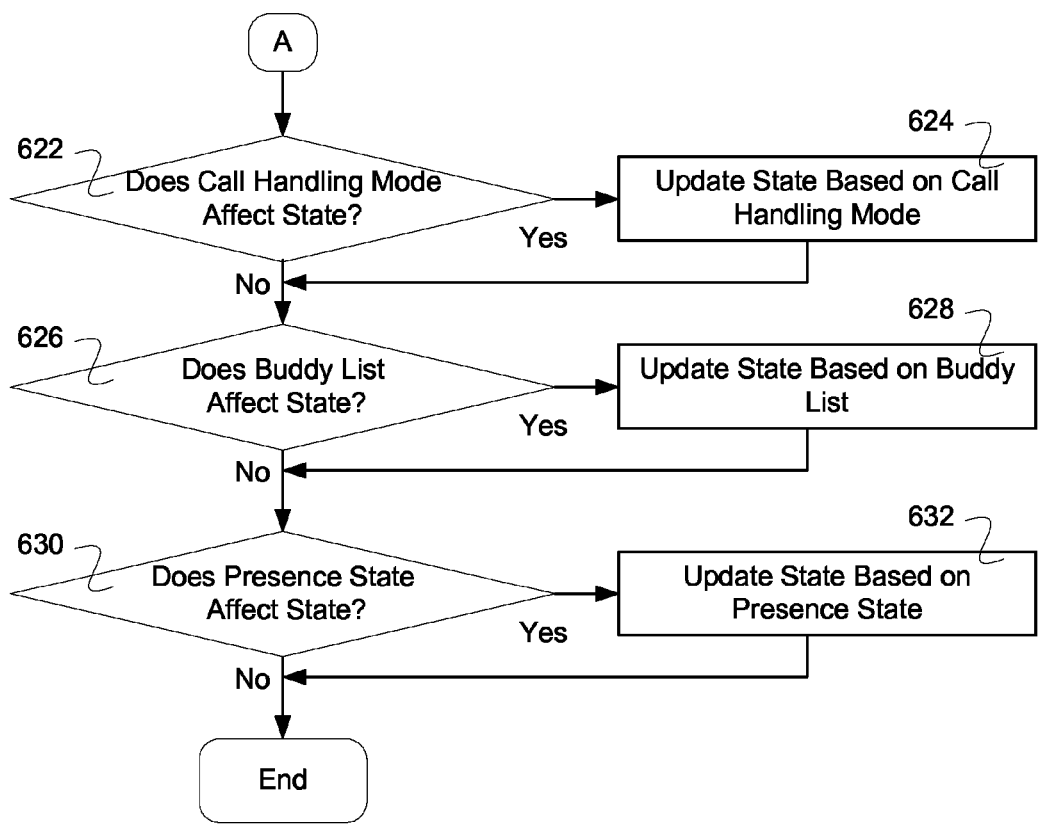

FIGS. 6A and 6B are flow diagrams illustrating an embodiment of a process for selecting a state based on a way point. In the example shown in 6A, in 600 a default state is selected based on the way point. In 602, it is determined if the date affects the state. If the date affects the state, then in 604 the state is updated. In 606, it is determined if the time affects the state. If the time affects the state, then in 608 the state is updated. If the time does not affect the state, control passes to 610. In 610, it is determined if the day of the week affects the state. If the day of the week affects the state, then in 612 the state is updated. If the day of the week does not affect the state, control passes to 614. In 614, it is determined if the previous way point affects the state. If the previous way point affects the state, then in 616 the state is updated. If the previous way point of the week does not affect the state, control passes to 618. In 618, it is determined if the previous state affects the state. If the previous state affects the state, then in 620 the state is updated, and control passes to A. If the previous state of the week does not affect the state, control passes to A.

In the example shown in FIG. 6B, from A control passes to 622. In 622, it is determined if the call handling mode affects the state. If the call handling mode affects the state, then in 624 the state is updated. If the call handling mode does not affect the state, control passes to 626. In 626, it is determined if the buddy list affects the state. If the buddy list affects the state, then in 628 the state is updated. If the buddy list does not affect the state, control passes to 630. In 630, it is determined if the presence state (e.g., a phone or computer presence state) affects the state. If the presence state affects the state, then in 632 the state is updated. If the presence state does not affect the state, the process ends.

Figure 7:
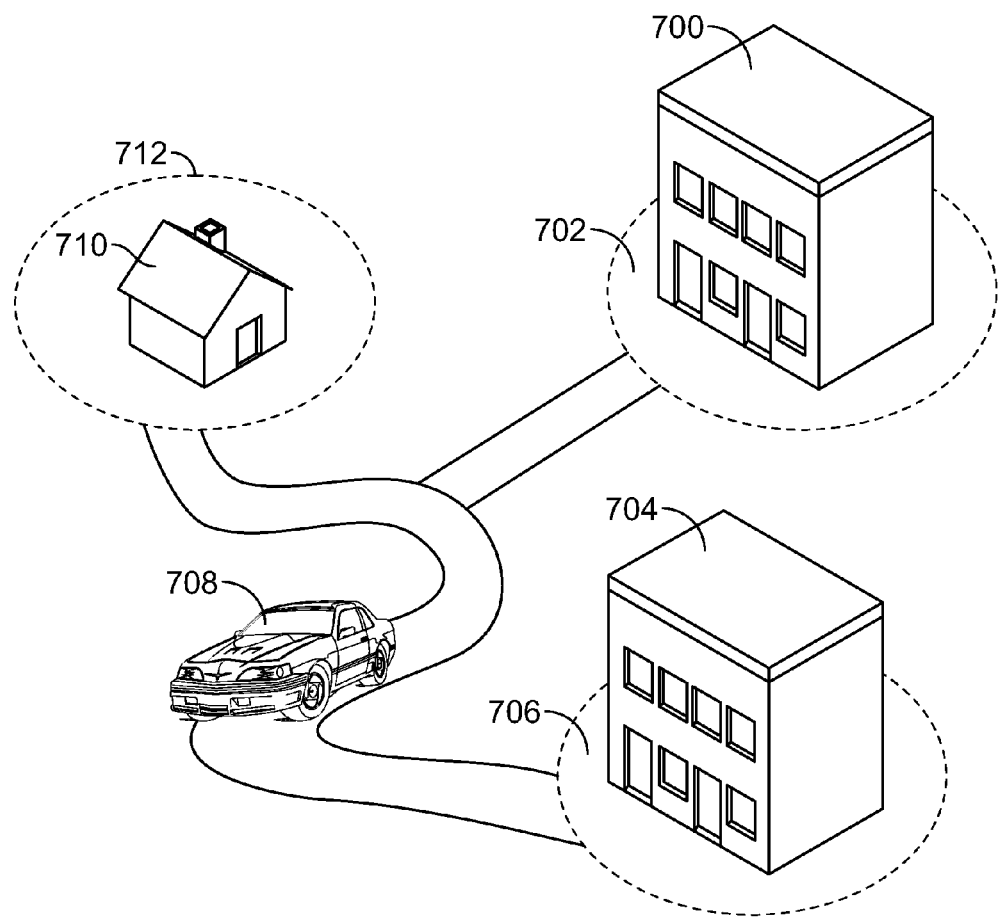
FIG. 7 is a block diagram illustrating locations in one embodiment.

FIG. 7 is a block diagram illustrating locations in one embodiment. In the example shown, locations include office building 700, office building grounds 702, court house 704, court house grounds 706, road 708, home 710, and house grounds/yard 712.

In some embodiments, a state associated with a way point of the road 708 to the office before working hours allows incoming calls to come to a cell phone, but the same way point after working hours or on the weekend routes calls to voicemail.

In some embodiments, a state associated with a way point of a home office in home 710 during working hours has incoming calls routed to the home office number, whereas during a vacation time the state associated with the way point of the home office (or home 710, house grounds/yard 712, office building 700) routes incoming calls to voicemail.

In some embodiments, a state associated with courthouse 704 during working hours but not on holidays plays message indicating 'at court' and forwards the incoming call to an assistant. Whereas a state associated with courthouse grounds 706 or office building grounds 702 routes calls to a cell phone number. In some embodiments, a state associated with courthouse 704 during working hours but for an incoming caller on a buddy list with priority routes the call to a mobile device.

Figure 8:
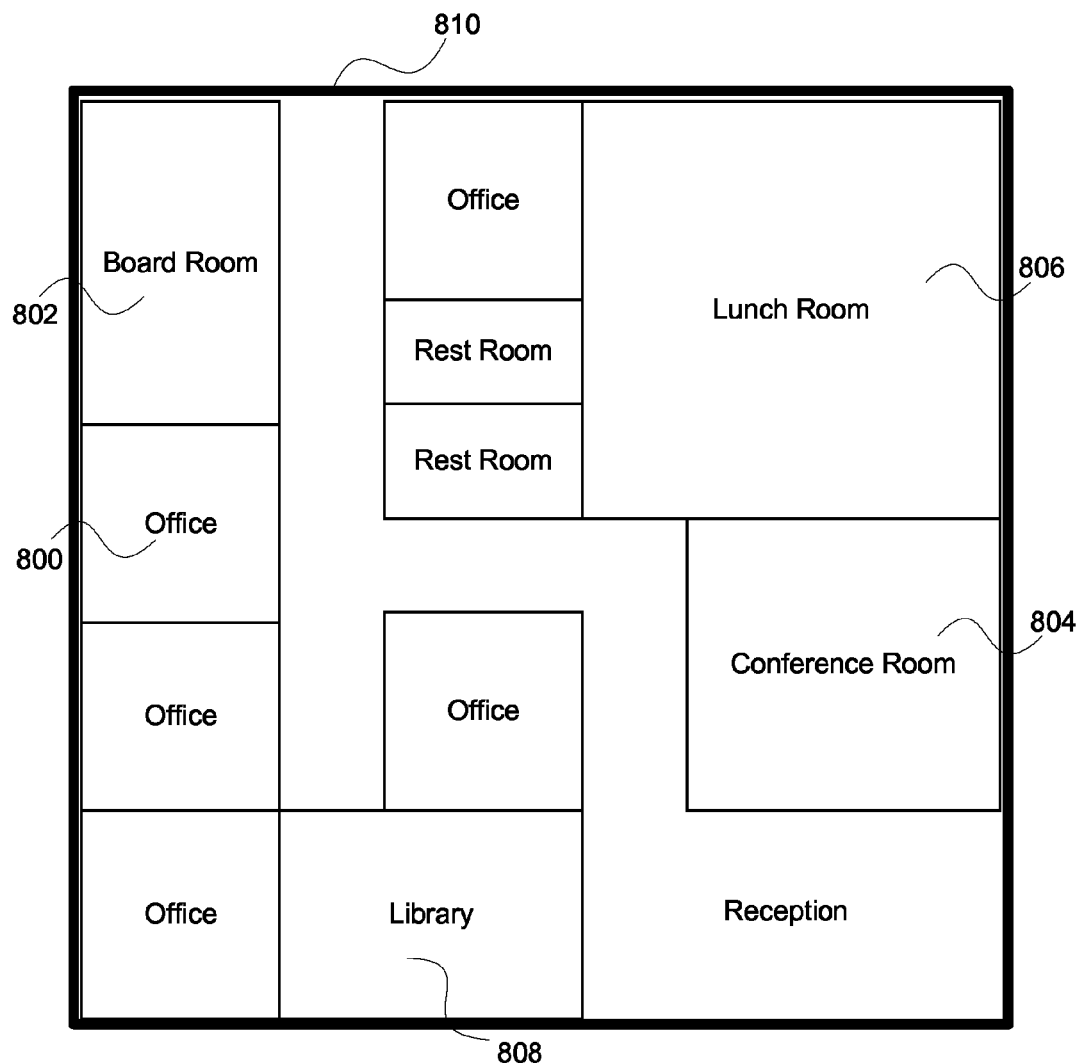
FIG. 8 is a block diagram illustrating locations in one embodiment.

FIG. 8 is a block diagram illustrating locations in one embodiment. In the example shown, locations include office 900, board room 802, conference room 804, lunch room 806, library 808, and the entire work site 810.

In some embodiments, a state associated with a way point of an office (e.g., office 800) has incoming calls routed to the phone on the office desk. Whereas a state associated with a way point where a user may be busy or not wanting to be disturbed (e.g., board room 802, lunch room 806, library 808, computer presence making a presentation, phone presence on hook, etc.), the state may indicate to route incoming calls to voicemail or a receptionist.

In some embodiments, for a floating worker, if on site (e.g., work site 810), the state may indicate to route to the nearest phone that can be used publicly (e.g., hall phone, reception area phone, etc.). In some embodiments, a floating worker is sent a photo or web link associated with the call.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of routing an incoming call for an IP phone system comprising:
    receiving a location data for a mobile device, wherein the location data indicates where the mobile device is located, and wherein the location comprises a latitude and a longitude;
    determining a way point based at least in part on the location data being near or inside an area associated with the way point, wherein determining the way point comprises:
        selecting a first way point from one or more possible way points in a way point database,
        determining whether the location data is located within an area associated with the first way point,
        in the event the location data is located within the area associated with the first way point, indicating the way point is the first way point,
        in the event that no way point of the one or more possible way points in the way point is determined to be associated with the location, indicating the way point is a default way point;
    determining a state for a user of the IP phone system based at least in part on the way point; and
    routing an incoming call to the IP phone system based at least in part on the state.

2. A computer program product for routing an incoming call for an IP phone system, the computer program product being embodied in a non-transitory computer readable medium and comprising computer instructions for:
    receiving a location data for a mobile device user, wherein the location data indicates where the mobile device is located, and wherein the location comprises a latitude and a longitude;
    determining a way point based at least in part on the location data being near or inside an area associated with the way point, wherein determining the way point comprises:
        selecting a first way point from one or more possible way points in a way point database,
        determining whether the location data is located within an area associated with the first way point,
        in the event the location data is located within the area associated with the first way point, indicating the way point is the first way point,
        in the event that no way point of the one or more possible way points in the way point is determined to be associated with the location, indicating the way point is a default waypoint;
    determining the state for a user of the IP phone system based at least in part on the way point; and
    routing an incoming call to the IP phone system based at least in part on the state.

3. A system for routing an incoming call for an IP phone system comprising:
    an interface for receiving a location data for a mobile device user, wherein the location data indicates where the mobile device is located, wherein the location comprises a latitude and a longitude;
    a way point determiner for determining a way point based at least in part on the location data being near or inside an area associated with the way point, wherein determining the way point comprises:
        selecting a first way point from one or more possible way points in a way point database,
        determining whether the location data is located within an area associated with the first way point,
        in the event the location data is located within the area associated with the first way point, indicating the way point is the first way point,
        in the event that no way point of the one or more possible way points in the way point is determined to be associated with the location, indicating the way point is a default waypoint;
    a processor for determining the state for a user of the IP phone system based at least in part on the way point; and
    a phone system interface for routing an incoming call to the IP phone system based at least in part on the state.

4. The system as in claim 3, wherein determining the way point comprises identifying the way point closest to the location data.

5. The system as in claim 3, wherein determining the way point comprises identifying a phone number associated with the location data.

6. The system as in claim 3, wherein the state is based at least in part on one or more of the following: a date and a time.

7. The system as in claim 3, wherein the state is based at least in part on one or more of the following: a day of the week and a holiday.

8. The system as in claim 3, wherein the state is based at least in part on one or more of the following: a call handling mode and a buddy list.

9. The system as in claim 3, wherein the state is based at least in part on one or more of the following: a phone presence state and a computer presence state.

10. The system as in claim 3, wherein the state is based at least in part on a previous way point.

11. The system as in claim 3, wherein the state is based at least in part on a previous state.

12. The system as in claim 3, wherein the state is based at least in part on an incoming caller's phone number.

13. The system as in claim 3, wherein routing the incoming call comprises routing the incoming call to the IP phone system to a phone number associated with the way point.

14. The system as in claim 3, wherein routing the incoming call comprises routing the incoming call to the IP phone system to voice mail.

15. The system as in claim 3, wherein routing the incoming call comprises routing the incoming call to the IP phone system to play a predetermined message.

16. A method of initiating a call for an IP phone system comprising:
    receiving a location data for a mobile device, wherein the location data indicates where the mobile device is located, and wherein the location comprises a latitude and a longitude;
    determining a way point based at least in part on the location data being near or inside an area associated with the way point, wherein determining the way point comprises:
        selecting a first way point from one or more possible way points in a way point database,
        determining whether the location data is located within an area associated with the first way point, in the event the location data is located within the area associated with the first way point, indicating the way point is the first way point, in the event that no way point of the one or more possible way points in the way point is determined to be associated with the location, indicating the way point is a default way point;

determining a state for a user of the IP phone system based at least in part on the way point; and initiating a call from the IP phone system to a destination phone number based at least in part on the state including initiating a call to a phone number associated with the way point.

17. A system for initiating a call for an IP phone system comprising:

an interface for receiving a location data for a mobile device, wherein the location data indicates where the mobile device is located, and wherein the location comprises a latitude and a longitude;

a way point determiner for determining a way point based at least in part on the location data being near or inside an area associated with the way point, wherein determining a way point comprises:

selecting a first way point from one or more possible way points in a way point database, determining whether the location data is located within an area associated with the first way point, in the event the location data is located within the area associated with the first way point, indicating the way point is the first way point, in the event that no way point of the one or more possible way points in the way point is determined to be associated with the location, indicating the way point is a default way point;

a processor for determining a state for a user of the IP phone system based at least in part on the way point; and a phone system interface for initiating a call from the IP phone system to a destination phone number based at least in part on the state including initiating a call to a phone number associated with the way point.

18. The system as in claim 17, wherein the way point is associated with a behavior.

19. The system as in claim 17, wherein determining the way point comprises identifying the way point closest to the location data.

20. The system as in claim 17, wherein determining the way point comprises identifying a phone number associated with the location data.

21. The system as in claim 17, wherein the state is based at least in part on a previous way point.

22. The system as in claim 17, wherein the state is based at least in part on a previous state.

23. The system as in claim 17, wherein the state is based at least in part on a location.

24. The system as in claim 17, wherein the area is a circle defined by a center location and a radius.

* * * * *